(12) United States Patent
Desmond

(10) Patent No.: US 6,179,229 B1
(45) Date of Patent: Jan. 30, 2001

(54) WASHING APPARATUS

(76) Inventor: Mark Desmond, 128 Lothrop St., Beverly, MA (US) 01915

(*) Notice: Under 35 U.S.C. 154(b), the term of this patent shall be extended for 0 days.

(21) Appl. No.: 09/302,684

(22) Filed: Apr. 29, 1999

Related U.S. Application Data

(60) Provisional application No. 60/083,469, filed on Apr. 29, 1998.

(51) Int. Cl.$^7$ ........................................................ B05B 9/08
(52) U.S. Cl. ............................................. 239/529; 239/211
(58) Field of Search .................................... 239/211, 529, 239/530, 548; 222/78; 601/169; D23/213, 214, 215, 222, 229

(56) References Cited

U.S. PATENT DOCUMENTS

| Re. 30,350 | * | 7/1980 | Peterson et al. | 239/394 |
|---|---|---|---|---|
| 1,534,208 | * | 4/1925 | Gibson | 239/529 X |
| 1,558,930 | * | 10/1925 | Schuck | 239/529 |
| 3,964,686 | * | 6/1976 | Lopez | 239/74 |

* cited by examiner

Primary Examiner—Andres Kashnikow
Assistant Examiner—Dinh Q. Nguyen
(74) Attorney, Agent, or Firm—McDermott, Will & Emery

(57) ABSTRACT

A device designed to wash and rinse pets, of a simple design, which dispenses shampoo and automatically mixes shampoo when washing the animal while replicating the familiar and enjoyable size and feel to the animal of a human hand in a scratching activity.

2 Claims, 3 Drawing Sheets

WASHING APPARATUS

This application claims the benefit of Provisional Application No. 60/083,469 filed Apr. 29, 1998.

BACKGROUND OF THE INVENTION

The invention relates to the extremely difficult and challenging task of trying to wash one's pet or any animal where typically a garden hose or otherwise indoor/outdoor pressure nozzle, sprayer or shower type technology exists. Animals typically detest this sensation of being blasted with high pressure water from a distance and will typically try desperately to escape to end this sensation, possibly necessitating the use of a severe and dangerous restraint mechanism, or a very poor wash or even worse, poor rinse. In addition to above, a problem exists where a hand is needed to hold the pet, another hand is needed to apply the water and another hand needed to scrub the object. This represents either a 3 handed person or a more than one-person effort.

Typically, animals in question, such as canines, horses, pigs, etc. continuously incorporate fat and oil compounds into their fur, in some cases 2 layers of fur, offering them inherent effective water repellency which furthers the complications of achieving one's goal of a fast, effective and complete wash and rinse.

Additionally, in current common situations, where the shampoo is simply applied directly to the wet or dry oily, water repellant, surface hair of the animal, then water applied to the said water resistant hair, the majority of the shampoo simply washes off the surface and does not penetrate or clean the inner hair and skin.

SUMMARY OF THE INVENTION

According to one aspect of the invention, there is provided a washing apparatus, comprising a housing made of a durable material and including a liquid inlet port and a plurality of elongated finger-like rigid extensions adapted for physical contact with the object being washed, each extension being in fluid communication with the liquid inlet port and including one or more orifices at the tips of the extensions for a liquid to pass therethrough out of the housing from a source of liquid, a valve near the liquid inlet port for introduction of a shampoo into the housing and adjustably controlling the flow of said liquid into the housing and an adapter engageable with the liquid inlet port for permitting removable engagement of the housing with the source of liquid. The flow of the liquid exiting the housing through the orifices is adjustable so as to replicate the physical contact of the extensions against the object being washed.

The housing preferably includes a handle portion opposite the finger-like extensions.

DETAILED DESCRIPTION OF THE PREFERRED EMBODIMENT

Figure 1:
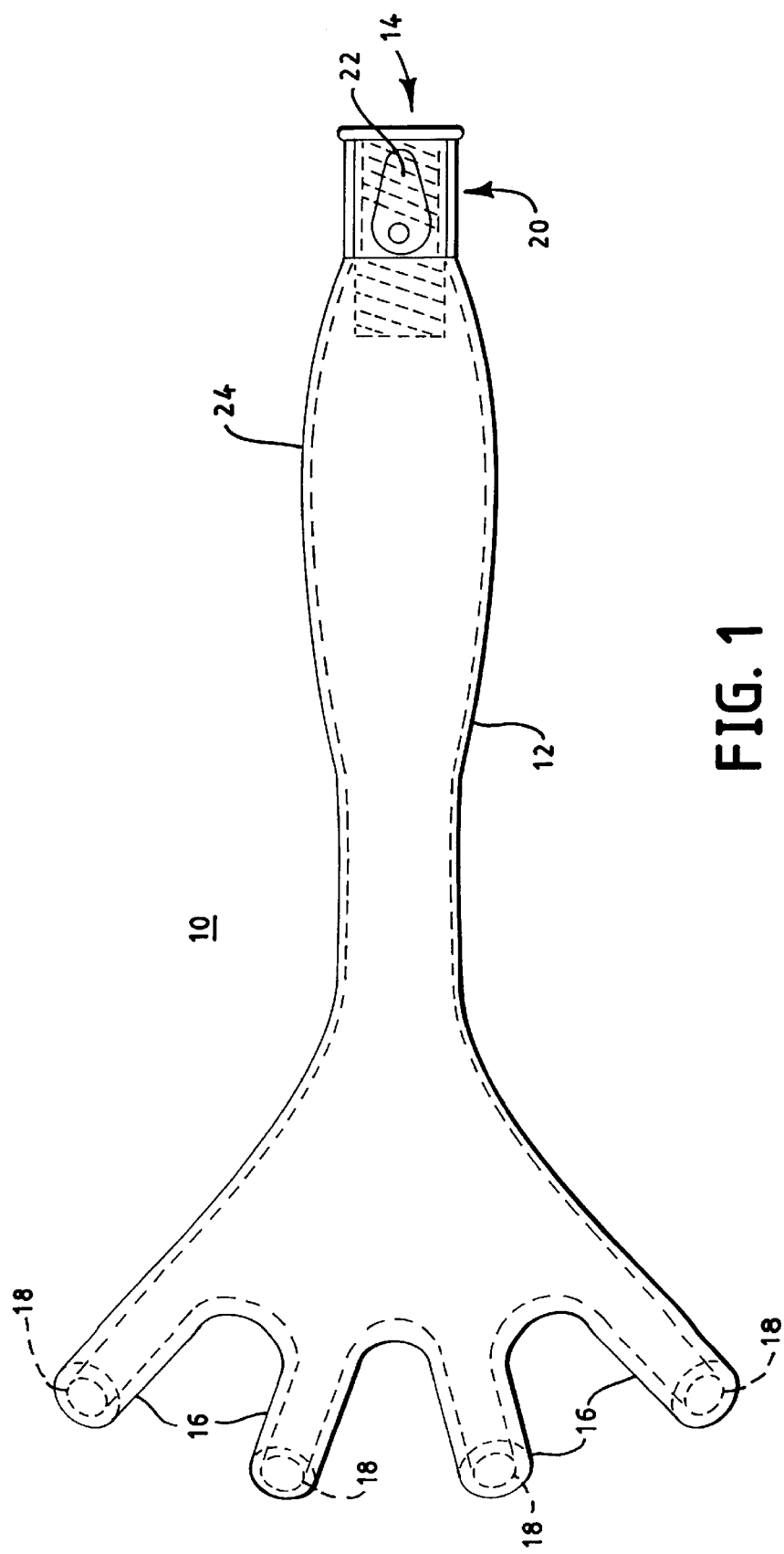
FIG. 1 is a top view of device, not to scale.
Figure 2:
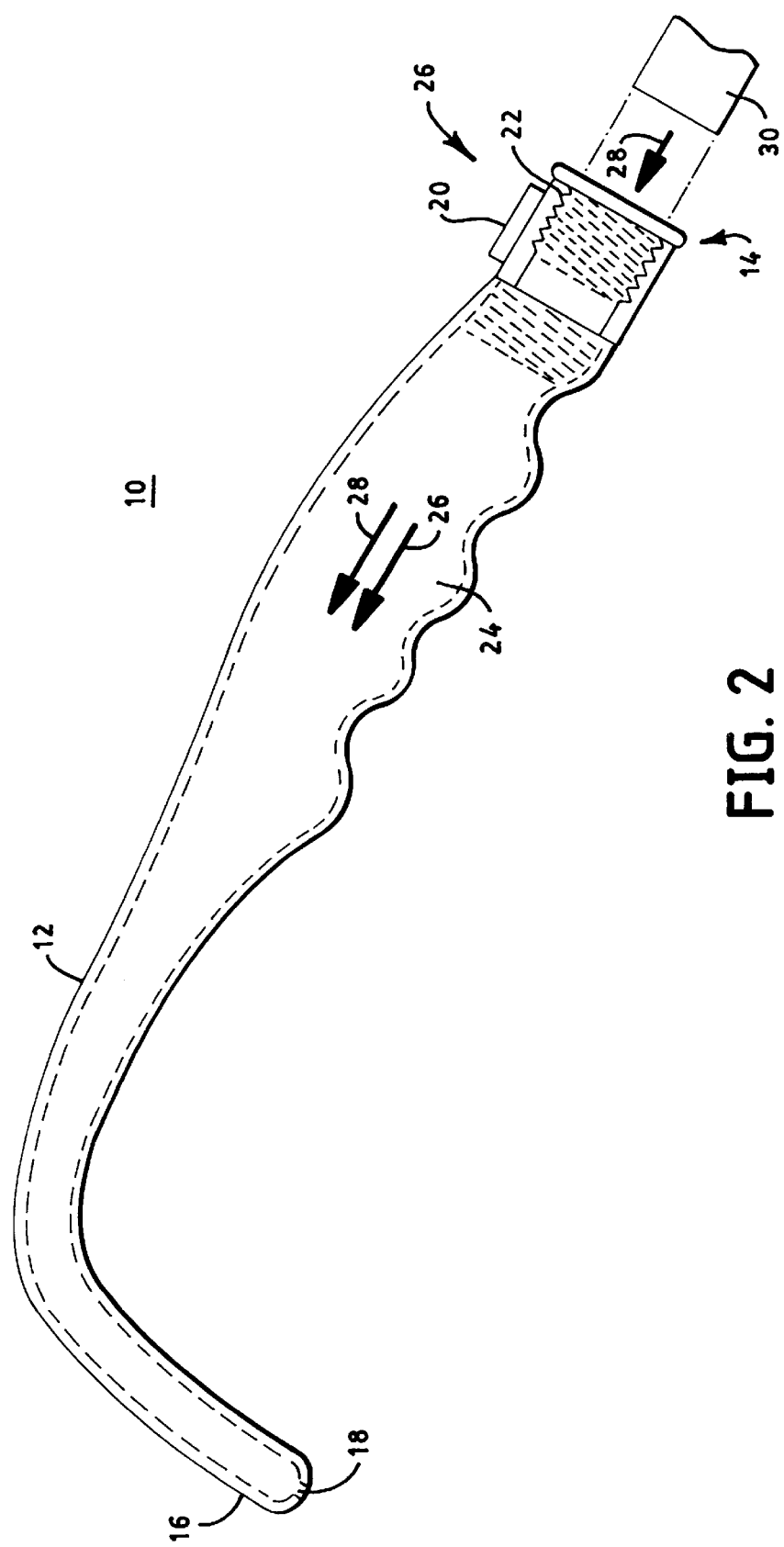
FIG. 2 is side view of device, not to scale.
Figure 3:
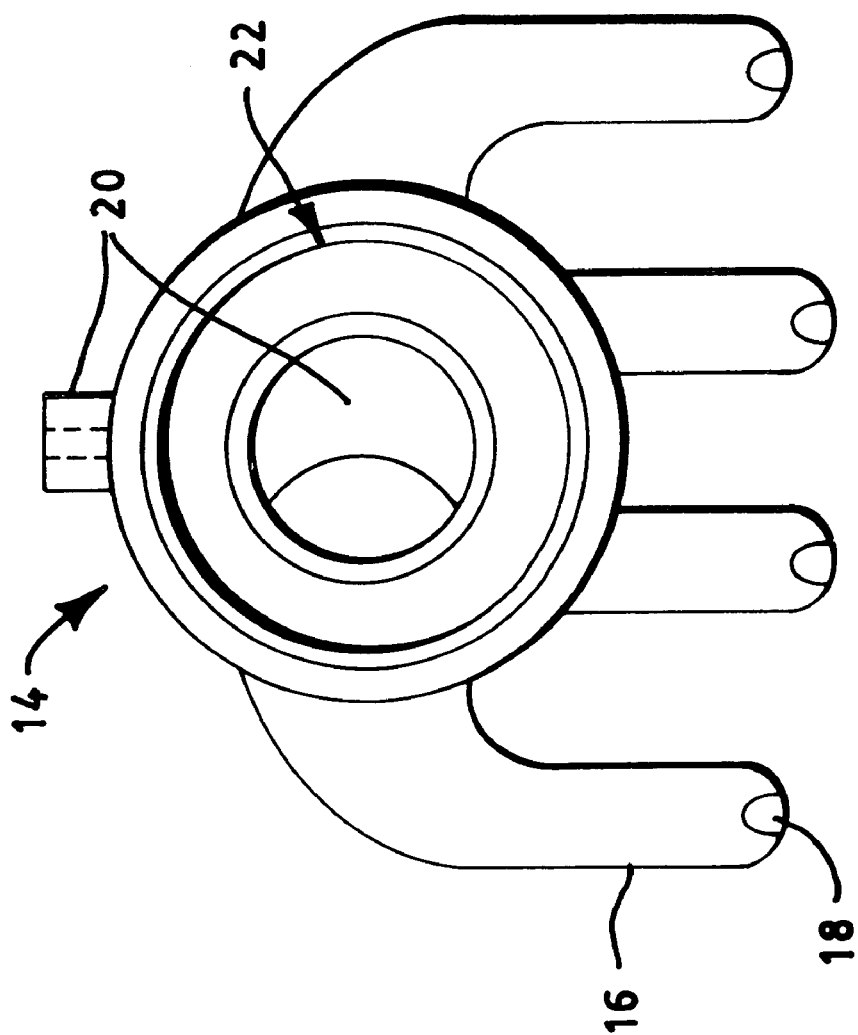
FIG. 3 is a rear view of the device.

This invention 10, by design, affords many solutions to the aforementioned problems:

By specific simple design it is extremely simple to use. A person will simply squirt the shampoo 26 into the integral valve 20 while the valve is open, into the inner body 12 of the device 10 and then turn off the integral valve. The device 10 is then attached, via inlet port 14, to a water source 30, possibly a garden hose using the integral hose thread, or shower/tub fixture via any readily available aftermarket adapter 22. Then the person will turn on the host water source 30, approach target animal (not shown) with no water emitting from the device, start a simple dry back scratch movement on the target, then slowly open the integral valve 20 to allow water 28 to flow through the device, with the water 28 mixing automatically with the shampoo 26 as it travels through the inside of the handle 24 and fingers 16 and orifices 18 at the tips of the fingers onto the pet. The person continues to move the device along the skin of the animal using back and forth and side to side motion until the water runs clean of all shampoo. The typical application for a 100-pound dog is 3 minutes total to clean.

By specific design of the extension 16 replicating the fingers of a human hand, the device 10 affords an enjoyable event for the animal by replicating an actual backscratch, therefore reducing or eliminating the need for physical restraint, incident of injury to both animal and human, and enhancing the efforts and results of the wash.

By specific design, the water 28, although under normal household water pressure as high as 60 PSI, can barely be felt by the animal as the water makes contact with the skin simultaneously with the contact and movement of the fingers 16, eliminating the sight, sound and feeling of pressurized water to the animal. This drastically reduces the stress and fear of the animal, allowing the animal much more opportunity to stay in place. Most applications experience the ability to maintain control of the animal, apply shampoo, apply water, scrub, rinse and achieve the best possible results very quickly, with one hand.

By nature of the design of the integrated hand grip handle 24, control of the device is very simple and requires little effort. In addition, the design allows the user to keep his or her hands out of the largely harsh shampoo and remain in most instances totally dry.

By nature of design, this device affords simple and effective washing of the larger body areas of the animal as well as the thinner extremities, such as the legs and tail, by moving the device in a parallel manner.

By nature of design, the included valve 20 allows the reduction or elimination of water flow for application of washing in sensitive areas, such as the eyes, ears and nose. With a simple movement of the strategically placed valve, full water flow may be assumed, jetting water onto the skin.

By design, the fingers 16 and orifices 18 allow the penetration and application of the shampoo 26 and water 28 way down through the thick oily hair directly onto the skin. This design affords total cleaning from the bottom out, allowing the release and movement of dirt, oil, old hair, etc., up, out and off of the animal.

By design of the widely spaced, long, stiff, narrow fingers 16, the device glides through the thickest, curliest, longest of hair without getting tangled or inducing friction as seen with many other current units made of short soft or hard rubber fingers.

By design, this device affords the maximum water flow possible, affording the fastest, most complete cleaning effort possible.

This device may also be attached to a garden hose, with appropriate integral receptacle. This device will also afford total control of water flow, possibly from the fingers 16 via orifices 18, with a built in valve 20 to adjust water to full off position to approach animal with no water evident, to low to medium flow for sensitive areas such as eyes, ears, and nose to full on position affording blasting water jets for complete wash and rinse in general.

This device is made of very strong material, possibly high density polyethylene plastic and is of very light weight to afford easy handling and control.

The unit may be 11 inches long by 4.5 inches wide at the fingers and 1.375 inches at the valve end. The unit may be 2.750 inches in overall height.

Secondary applications may include but are not limited to home/garden tool, weeding, aerating and injecting water simultaneously, fabric/carpet cleaning, back scratcher, etc.

What is claimed is:

1. A washing apparatus, comprising a housing made of a durable material and including a liquid inlet port and a plurality of elongated finger-like rigid extensions adapted for physical contact with the object being washed, each extension being in fluid communication with the liquid inlet port and including one or more orifices at the tips of the extensions for a liquid to pass therethrough out of the housing from a source of liquid, a valve near the liquid inlet port for introduction of a shampoo into the housing and adjustably controlling the flow of said liquid into the housing, and an adapter engageable with the liquid inlet port for permitting removable engagement of the housing with the source of liquid, wherein the flow of the liquid exiting the housing through the orifices is adjustable so as to replicate the physical contact of the extensions against the object being washed.

2. A washing apparatus according to claim 1, wherein the housing includes a handle portion opposite the finger-like extensions.

* * * * *